United States Patent [19]

Schnuda

[11] Patent Number: 5,368,626
[45] Date of Patent: Nov. 29, 1994

[54] GROWTH MEDIUM AND METHOD

[75] Inventor: Daniel N. Schnuda, Inverness, Ill.

[73] Assignee: Chicago International Corp., Ltd., Barrington, Ill.

[21] Appl. No.: 687,374

[22] Filed: Apr. 18, 1991

[51] Int. Cl.$^5$ .................. C05F 15/00; C05F 5/00; C05F 3/00
[52] U.S. Cl. ............................. 71/23; 71/11; 47/9; 47/DIG. 9; 47/DIG. 10
[58] Field of Search ............. 47/DIG. 9, DIG. 10; 71/23, 903, 904, 11

[56] References Cited

U.S. PATENT DOCUMENTS

| | | | |
|---|---|---|---|
| 4,707,176 | 11/1987 | Durham | 47/59 X |
| 4,777,763 | 10/1988 | Shannon et al. | 71/25 |
| 4,786,308 | 11/1988 | Colling | 71/24 |

FOREIGN PATENT DOCUMENTS 2105699  3/1983  United Kingdom .................. 71/23

*Primary Examiner*—Ferris Lander
*Attorney, Agent, or Firm*—Wood, Phillips, VanSanten, Hoffman & Ertel

[57] ABSTRACT

A growth medium that is capable of supporting plant life includes a water retention component and soil. The water retention component can be a water retaining grain polish, bran or cut, short mineral wool fibers. A method of making the growth medium includes the steps of providing the water retention component and the soil, applying the water retention component to the soil and admixing the water retention component into the soil to distribute the water retention material within the soil to improve the water retaining capabilities of the soil. Vegetation matter, especially when mixed with animal excrement, will also contribute to the water retention property of the growth medium in addition to its slow release nutrient.

16 Claims, No Drawings

GROWTH MEDIUM AND METHOD

TECHNICAL FIELD

The present invention relates to a growth medium and method of making the growth medium. In particular, the present invention relates to a growth medium including a water retention component and slow release nitrogen rich organic components mixed with soil. The water retention component can be a water retaining synthetic substance such as short mineral wool fibers cut into small pieces homogeneously mixed with various plant fibers. Grain polish or bran could be added in a small proportion to increase the water retaining capability and as a nutrient.

BACKGROUND OF THE INVENTION

Plants extend roots into soil to take up water and nutrients therefrom for plant growth. The water in the soil can be taken up by the plant, evaporated by the action of the sun or wind, or absorbed deeper into the soil beyond the reach of the roots. Water that evaporates or is absorbed deeper into the soil is unavailable to the plant for sustaining plant growth. This is especially troublesome in environments where the water supply is limited or water conservation is desired because significant amounts of the water applied to the soil for plant growth is lost.

Often, it is desirable to cultivate soil that is not near an abundant supply of water. To accomplish this cultivation, the land is often irrigated by water brought from great distances or deep wells. However, as the soil is not adapted for plant growth, there is a greater tendency for the water to be wasted and lost due to evaporation from, or absorption deeper into, the soil.

Deserts by their nature have little water and typically sandy soil, are often unsuitable for cultivation and usually do not support plant life. Wind swept regions and rocky regions also offer poor growing conditions and often do not support plant life. This absence of plant life often makes the land uninhabitable by animals.

The agricultural industry desires improved water conservation while maintaining plant growth and desires to increase the amount of land available to sustain plant growth with minimal use of water. The present invention satisfies at least some of these desires.

SUMMARY OF THE INVENTION

The present invention is directed to a growth medium having an enhanced ability to sustain plants. This enhancement is achieved because the growth medium has a water retention capability so that the water is readily accessible to the roots of the plants. The growth medium includes soil admixed with a water retention components that can be a water retaining polish or bran from a grain, vegetation and short fibers of mineral wool. Animal excrement and/or dead vegetative matter can be present in the growth medium. Grain polish or bran can be added to the mixture.

The present invention is also directed to a method of making a growth medium having an enhanced ability to sustain plants by providing water retention components that can be a water retaining mineral wool and dead vegetative matter such as cut plant stalks and/or peat providing soil, applying the water retaining component to the soil and mixing the water retention component and the soil to distribute the water retention material within the soil to improve the water retaining capabilities of the soil. Preferably, the water retention component is applied by distribution on top of the soil into which the water retention component is to be mixed.

The growth medium can be an admixture of the water retention component and seeds that is applied to the grounds. A nitrogen source, preferably a slow release nitrogen source such as animal excrement mixed with plant fibers such as cut plant stalks, e.g., corn or peat, can also be present in the growth medium.

The growth medium is especially useful when it is desired to reduce the amount of water required to be applied to a plant to sustain the plant. This reduction in water is an enhancement in sustaining plant growth as compared to soil lacking the water retention component.

Environments in which the growth medium is useful include environments experiencing water shortages, environments where water conservation is important and environments where the soil does not retain water as well as desired. The present invention is especially useful when the soil is sand and the environment is a desert environment. The various components of the growth medium reduce the sand's porosity.

The growth medium can be applied on rocky terrain to facilitate plant growth. Top soil is not necessary in this situation.

Numerous other advantages and features of the present invention will become readily apparent from the following detailed description of the invention.

DETAILED DESCRIPTION OF THE PREFERRED EMBODIMENT

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

The growth medium of the present invention includes a water retention component admixed with soil. The water retention component is a water retaining short mineral wool fibers, vegetation, and polish or bran of a grain. The water retention component maintains water in the growth medium. Plants having roots that extend into the growth medium can draw on this water and are thus sustained.

Alternatively, the growth medium can be an admixture of the water retention component nitrogen containing organic components and seeds that is applied to the ground.

The growth medium can be made by admixing the water retention component and the soil in a conventional mixer that can cut the short mineral wool fibers and plant stalks. Preferably, the growth medium is homogeneous. The growth medium can then be applied on top of the ground by spraying or spreading.

Preferably, the growth medium is made in situ by conventionally spraying or spreading the water retention component on top of the soil. The water retention component is then turned into the soil by a conventional farm implement such as a plow, harrow, tiller or the like to produce the growth medium. The depth of the soil into which the water retention component is mixed is selected to provide the desired thickness of the layer of growth medium.

The growth medium can also include optional, preferably dry, components such as animal excrement, dead vegetative matter, plant seeds and the like.

The water retention component includes at least one of short mineral wool fibers, and/or a water retaining vegative matter, e.g., cut plant stalks (such as corn, sugar cane and sunflower stalks). The porosity of the soil, especially sand, is reduced by the water retention component and other ingredients, especially when the water retention component is cut mineral wool, vegetation matter and/or a grain polish. The reduction in porosity is presently believed to contribute to the water retaining capability of the growth medium.

The short mineral wool fibers are of such a length that there is little entanglement of the fibers and the fibers can be admixed with the soil and other optional components of the growth medium. A collection of short mineral wool fibers is fluffy which contributes to the growth medium being relatively fluffy and having a low density. Preferably, the fibers do not cause clumping of the growth medium that would require additional processing to break up the clumps. If clumps form, they do not adversely affect water retention or plant growth. Representative of the mineral wool suitable for use herein are rock wool, glass wool and the like.

The soil can be any soil that is capable or incapable of sustaining plant growth. A preferred soil that is incapable of sustaining plant growth is sand.

The water retention components are present in the growth medium in an amount effective to increase the water retention of the soil. Preferably, the ratio of the thickness of the water retention components to the thickness of the soil into which the water retention components are mixed is in the range of about 1:1 to about 1:10, more preferably the thickness ratio is in the range of about 1:3 to 1:8, prior to mixing. The preferred weight ratio of water retention components to soil is in the range of about 1:4 to about 1:50, more preferably the weight ratio is in the range of about 1:12 to about 1:40. Preferably, the ratio of water retention component to soil is within at least one of the above ranges.

The growth medium can be utilized with living members of the Plantae Kingdom. Preferably, the plant is a vegetable, grain, or used for landscaping or to provide raw materials.

The animal excrement that the growth medium can contain is selected to provide additional nutrients to the plant during growth and is selected to have a composition that does not adversely affect the growth of the plants. Different plants have different nutritional requirements and the animal excrement can be utilized to provide some of these nutritional requirements. The excrement can be admixed with the water retention component, the soil or the growth medium.

Representative of the animal excrement that are suitable for use in the growth medium are chicken manure, cow manure, sewage sludge and the like.

The dead vegetative matter of the growth medium can have been used to facilitate collection of the animal excrement. For example, the vegetative matter can have been spread on the ground of an animal pen. The animals pass excrement upon the vegetative matter and the excrement dries thereon. The vegetative matter having animal excrement is then collected and used in the growth medium. Phosphates can be added to the vegetative matter and animal excrement. The vegetative matter can be cut with or without excrement to facilitate mixing with the remainder of the growth medium. The vegetative matter can be cut by the blades of the mixer. The vegetative matter can be utilized without having animal excrement thereon. The vegetative matter can be admixed with the water retention component, the soil or the growth medium. The vegetative matter could be composted earlier to contribute to the soil with slow release nitrogen rich organic matter which makes an excellent nutrient to the plant. This natural fertilizer produces better and healthier crops. The nitrogen rich natural organic vegetative matter can eliminate the use of chemical fertilizers which could be harmful to the soil.

Representative of the dead vegetative matter suitable for use in the growth medium are straw, hay, plant (e.g. corn) stalks, peat and the like.

When the growth medium is produced in situ and the plant seeds with which the growth medium is to be sown are relatively small it is highly desirable to admix the water retention component with the seeds prior to application on top of the soil. The admixture can be applied using a jet air pump. Alternatively, the seeds can be admixed with the soil or growth medium.

Representative vegetables include tomatoes, cucumbers, melons, legumes, potatoes lupin beans, chick peas and the like. Representative grains include barley, wheat, soybean, corn and the like. Representative landscaping plants include grasses, alfalfa, and the like. Representative of plants used to provide raw materials include jute, cotton and the like.

Conventional chemical fertilizers, insecticides, herbicides and the like need not be applied to the plants during the growth of the plants since the growth medium mixture can furnish the soil with rich natural organic nutrients.

A layer of growth medium of about 0.5 to about 5 centimeters (cm) thick can be used for many plants such as vegetables, grasses, grains and the like. Roots of these plants will extend into the growth medium. Some roots can extend through the growth medium into the soil below the growth medium to provide additional stability for the plant. Offshoots of the roots extending into the soil can seek water and can turn upward toward the growth medium which has water. For larger plants such as shrubs, trees and the like, a thicker layer of growth medium is desired.

Alternatively, when the growth medium is an admixture of the water retention components and plant seeds, the growth medium can be applied on top of the soil without mixing the growth medium into soil. This alternative is especially useful in areas where it is difficult to mix the growth medium into the soil. Preferably, this growth medium is applied at a thickness of in the range of about 0.5 to about 1 cm.

Experiments were conducted using growth mediums made from rice polish as the water retention component mixed with manure and sand from the northeastern desert of Egypt close to Mansoura as the soil. A control for each experiment was run using sand alone or sand admixed with a fertilizer.

In one experiment, growth mediums 1, 2, 3, 4 and were produced by admixing rice polish and sand in thickness ratios of 1:1 cm, 1:3 cm, 1:5 cm, 1:7 cm and 1:9 cm, respectively. Control 1 was sand alone. Equal amounts of water was introduced to each of the growth mediums and control 1. The conditions to which the growth mediums and control 1 were exposed were identical. After a time period of three days, the growth mediums ranged from wet to humid to the touch with the growth mediums having the higher concentration of rice polish being wet and those having a lower concentration being humid. Control 1 was dry to the touch. This experiment indicates that the growth medium retains water better than sand.

In another experiment, growth mediums 6, 7 and 8 were produced by admixing rice polish and sand in a thickness ratio of 1:3 cm, 1:5 cm and 1:7 cm, respectively, admixing 80 weight percent (wt %) of the rice polish and sand admixture, 15 wt % straw and 5 wt % chicken excrement and seeds. A control 2 was produced by admixing sand, fertilizer and seeds. Growth mediums 6, 7 and 8 and control 2 were maintained outside under identical conditions. Water was provided at the same time intervals to growth mediums 6, 7 and 8 and control 2. Two samples of each of the growth mediums 6, 7 and 8 were tested using water levels of one and two liters, respectively. Both water levels resulted in good growth of the seeds. One sample of control 2 was treated with two liters of water and resulted in seed growth that was not good. The seed growth was about 2.5 times better for growth mediums 6, 7 and 8 than for control 2. Representative of the seeds that were tested include tomatoes, chick peas, eggplant, wheat, soybean, corn, barley, lupin beans and jute. This experiment indicates that the growth medium can sustain superior plant growth.

The growth medium can sustain plant growth for more than one growing season if conditions are favorable. The ability to obtain more than one planting using the growth medium enhances the cost effectiveness because the cost of purchasing and applying the growth medium can be spread over more than one growing season. It is possible that the infertile land can be converted permanently to fertile land by one application of the growth medium provided the land is well maintained and replanted. The unharvested portions of the plant can, when plowed back into the land, provide additional nitrogen to improve the land. Reduced amounts of growth medium, as compared to the initially applied amount, can be added to the land in the future to further enhance water retention.

The growth medium enables plants to be grown with less water. The ability to sustain plant growth using less water promotes water conservation and can enable plants to be grown in environments such as deserts having little water and therefore little ability to sustain plant growth. The growth medium can also be used in environments having little soil such as rocky environments. The method of making the growth medium in situ by applying the water retention components on top of the soil or mixing it into the soil provides an easy and economical way of making the growth medium.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

I claim:

1. A growth medium having an enhanced ability to sustain plants, the growth medium consisting essentially of:

a water retention component comprising rice grain polish, vegetation selected from the group consisting of corn, sugar cane and sunflower stalks and short mineral wool fibers; and
   soil.

2. The growth medium in accordance with claim 1 wherein the water retention water retention component and soil are present in a ratio of the thickness of the water retention water retention component to the thickness of the soil, prior to admixing in the range of about 1:1 to about 1:10 or a weight ratio in the range of about 1:4 to about 1:50.

3. The growth medium in accordance with claim 1 wherein the water retention component and soil are present in a ratio of the thickness of the water retention water retention component to the thickness of the soil, prior to admixing in the range of about 1:3 to about 1:8 or a weight ratio in the range of about 1:12 to about 1:40.

4. The growth medium in accordance with claim 1 further comprising animal excrement.

5. The growth medium in accordance with claim 1 wherein the soil is sand.

6. A growth medium having an enhanced ability to sustain plants by retaining water in the growth medium, the growth medium consisting essentially of an admixture of a water retention component comprising rice grain polish, mineral wool fibers, animal excrement, and vegetation selected from the group consisting of corn, sugar cane and sunflower stalks; and soil.

7. The growth medium in accordance with claim 6 wherein the water retention component and soil are present in a ratio of the thickness of the water retention component to the thickness of the soil prior to admixing is in the range of about 1:1 to about 1:10 or in a weight ratio in the range of about 1:4 to about 1:50.

8. The growth medium in accordance with claim 6 wherein the water retention component and soil are present in a ratio of the thickness of the water retention component to the thickness of the soil prior to admixing is in the range of about 1:3 to about 1:8 or in a weight ratio in the range of about 1:12 to about 1:40.

9. A method of making a growth medium having an enhanced ability to sustain plants comprising the steps of:

providing a water retention component consisting essentially of rice polish, vegetation selected from the group consisting of corn, sugar cane and sunflower stalks and short mineral wool fibers;
   providing soil;
   applying the water retention component to the soil; and
   mixing the water retention component into the soil to distribute the water retention component within the soil and produce the growth medium.

10. The method in accordance with claim 9 wherein the water retention water retention component and the soil to be admixed are provided in layers having known thicknesses and the ratio of the thickness of the water retention water retention component to the thickness of the soil is in a thickness ratio range of about 1:1 to about 1:10 or known weights and the weight ratio is in the range of about 1:4 to about 1:50.

11. The method in accordance with claim 9 wherein the water retention water retention components and the soil to be admixed are provided in layers having known thicknesses and the ratio of the thickness of the water retention component to the thickness of the soil is in a thickness ratio range of about 1:3 to about 1:8 or known weights and the weight ratio is in the range of about 1:12 to about 1:50.

12. The method in accordance with claim 9 wherein the water retention water retention component is applied on top of the soil.

13. The method in accordance with claim 9 wherein the soil is sand.

14. A method of making a growth medium having an enhanced ability to sustain plants comprising the steps of:

providing a water retention component consisting essentially of rice grain polish, short mineral wool fibers, animal excrement and vegetation selected from the group consisting of corn, sugar cane and sunflower stalks;

providing soil;

applying the water retention component to the soil; and mixing the water retention component within the soil to produce the growth medium.

15. The method in accordance with claim 14 wherein the animal excrement is bird excrement.

16. The method in accordance with claim 14 further comprising the steps of:

providing seeds; and admixing the seeds into at least one of the water retention component, soil or growth medium.

* * * * *